US009015195B1

(12) United States Patent
Sanghai

(10) Patent No.: US 9,015,195 B1
(45) Date of Patent: Apr. 21, 2015

(54) PROCESSING MULTI-GEO INTENT KEYWORDS

(71) Applicant: Google Inc., Mountain View, CA (US)

(72) Inventor: Sumit Sanghai, Whitefield Bangalore (IN)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 13/750,999

(22) Filed: Jan. 25, 2013

(51) Int. Cl.
G06F 17/30 (2006.01)

(52) U.S. Cl.
CPC ................................ G06F 17/30542 (2013.01)

(58) Field of Classification Search
CPC .............. G06Q 30/02; G06Q 30/0241; G06F 17/30861
USPC ................... 707/780, 771; 705/14.49
See application file for complete search history.

(56) References Cited

U.S. PATENT DOCUMENTS

| | | | |
|---|---|---|---|
| 6,243,708 B1 * | 6/2001 | deVries et al. ........................ 1/1 |
| 6,751,605 B2 | 6/2004 | Gunji et al. |
| 7,051,017 B2 | 5/2006 | Marchisio |
| 7,499,914 B2 * | 3/2009 | Diab et al. ........................... 1/1 |
| 7,668,832 B2 * | 2/2010 | Yeh et al. ...................... 707/770 |
| 7,774,348 B2 * | 8/2010 | Delli Santi et al. ........... 707/748 |
| 7,788,252 B2 * | 8/2010 | Delli Santi et al. ........... 707/708 |
| 7,805,450 B2 * | 9/2010 | Delli Santi et al. ........... 707/754 |
| 7,849,071 B2 * | 12/2010 | Riise et al. ..................... 707/708 |
| 7,860,885 B2 | 12/2010 | Chow et al. |
| 8,301,639 B1 * | 10/2012 | Myllymaki et al. ........... 707/748 |
| 8,306,973 B2 * | 11/2012 | Ohazama et al. .............. 707/724 |
| 8,458,179 B2 | 6/2013 | Chow et al. |
| 8,626,576 B1 * | 1/2014 | Pisaris-Henderson et al. ............................. 705/14.1 |
| 8,661,046 B2 | 2/2014 | King et al. |
| 8,725,796 B2 | 5/2014 | Serena |
| 2002/0169760 A1 * | 11/2002 | Cheung et al. ..................... 707/3 |
| 2004/0030490 A1 * | 2/2004 | Hegedus et al. .............. 701/200 |
| 2004/0044515 A1 | 3/2004 | Metcalf et al. |
| 2005/0050097 A1 * | 3/2005 | Yeh et al. .................... 707/104.1 |

(Continued)

FOREIGN PATENT DOCUMENTS

WO     WO 2013/003034     1/2013

OTHER PUBLICATIONS

Sanderson et al., "Analyzing Geographic Queries", In Proceedings of the ACM SIGIR Workshop on GIR, 2004, 2 pages.*

(Continued)

*Primary Examiner* — Phuong Thao Cao
(74) *Attorney, Agent, or Firm* — Fish & Richardson P.C.

(57) ABSTRACT

For processing multi-geo intent keywords, a keyword is identified from a webpage corresponding to an advertiser. A plurality of search queries which include the keyword are obtained. For each search query of the plurality of search queries, a determination is made whether the search query includes a location term, and in response to the determination that the search query includes the location term, the location term is associated with the keyword. A determination is made that the keyword is multi-geo intent keyword having multiple geographical locations associated therewith, based on multiple location terms being associated with the keyword. In response to identifying the keyword as multi-geo intent keyword, a determination is made that the webpage does not correspond to a single geo-location. The keyword is provided as a suggestion to the advertiser for bidding, based on the determination that the webpage does not correspond to a single geo-location.

20 Claims, 4 Drawing Sheets

(56) References Cited

U.S. PATENT DOCUMENTS

| | | | |
|---|---|---|---|
| 2005/0228797 A1* | 10/2005 | Koningstein et al. | 707/100 |
| 2008/0016055 A1* | 1/2008 | Riise et al. | 707/5 |
| 2008/0114721 A1* | 5/2008 | Jones et al. | 707/2 |
| 2008/0222119 A1* | 9/2008 | Dai et al. | 707/4 |
| 2008/0243611 A1* | 10/2008 | Delli Santi et al. | 705/14 |
| 2008/0243783 A1* | 10/2008 | Santi et al. | 707/3 |
| 2008/0243824 A1* | 10/2008 | Riise et al. | 707/5 |
| 2009/0019066 A1* | 1/2009 | Wang et al. | 707/100 |
| 2010/0131350 A1* | 5/2010 | Yeh et al. | 705/14.41 |
| 2010/0257163 A1* | 10/2010 | Ohazama et al. | 707/724 |
| 2010/0281011 A1* | 11/2010 | Santi et al. | 707/706 |
| 2010/0299200 A1* | 11/2010 | Delli Santi et al. | 705/14.49 |
| 2010/0318489 A1 | 12/2010 | De Barros et al. | |
| 2011/0173572 A1* | 7/2011 | van Zwol et al. | 715/856 |
| 2011/0184981 A1* | 7/2011 | Lu et al. | 707/774 |
| 2011/0251901 A1* | 10/2011 | Kwon et al. | 705/14.71 |
| 2011/0252064 A1* | 10/2011 | Murugappan | 707/780 |
| 2011/0270884 A1* | 11/2011 | Li et al. | 707/780 |
| 2011/0289063 A1* | 11/2011 | Radlinski et al. | 707/706 |
| 2012/0036008 A1* | 2/2012 | Robertson et al. | 705/14.43 |
| 2012/0151534 A1* | 6/2012 | Ponomarev et al. | 725/62 |
| 2012/0158712 A1* | 6/2012 | Karanjkar et al. | 707/724 |
| 2012/0166416 A1* | 6/2012 | Murdock et al. | 707/711 |
| 2012/0173344 A1* | 7/2012 | Zhang et al. | 705/14.71 |
| 2013/0006771 A1 | 1/2013 | Parikh | |

OTHER PUBLICATIONS

Xiao et al., "Discovering Co-located Queries in Geographic Search Logs", In Proceedings of the First International Workshop on Location and the Web 2008 (LOCWEB 08), pp. 77-84, ACM, 2008.*

Yi et al., "Discovering Users' Specific Geo Information in Web Search", in WWW 2009, Apr. 20-24, 2009, Madrid, Spain, pp. 481-490.*

* cited by examiner

PROCESSING MULTI-GEO INTENT KEYWORDS

Advertisers may bid on specific keywords appearing in a user query, where the advertiser's advertisement is presented along with the results of the user query (e.g., if the bidding is successful). The bidding process typically involves a set of keywords for each advertiser, where queries including the keyword are related to the advertisement.

SUMMARY

The disclosed subject matter relates to machine-implemented method for processing multi-geo intent keywords. The method comprises identifying a keyword from a webpage corresponding to an advertiser, and obtaining a plurality of search queries which include the keyword. The method further comprises, for each search query of the plurality of search queries, determining whether the search query includes a location term, and associating, in response to the determination that the search query includes the location term, the location term with the keyword. The method further comprises determining that the keyword is a multi-geo intent keyword having multiple geographical locations associated therewith, based on multiple location terms being associated with the keyword, determining, in response to determining that the keyword is a multi-geo intent keyword, that the webpage does not correspond to a single geo-location, and providing the keyword as a suggestion to the advertiser for bidding, based on the determination that the webpage does not correspond to a single geo-location.

The disclosed subject matter further relates to a system for processing multi-geo intent keywords. The system comprises one or more processors, and a machine-readable medium comprising instructions stored therein, which when executed by the processors, cause the processors to perform operations comprising identifying a keyword from a webpage corresponding to an advertiser, accessing multiple search queries associated with a searching service, and filtering out those queries of the multiple queries that do not include the keyword, obtaining a plurality of search queries which include the keyword, based on the filtering. The operations further comprise, for each search query of the plurality of search queries, determining whether the search query includes a location term, and associating, in response to the determination that the search query includes the location term, the location term with the keyword. In addition, the operations comprise determining that the keyword is a multi-geo intent keyword having multiple geographical locations associated therewith, based on multiple location terms being associated with the keyword, determining, in response to determining that the keyword is a multi-geo intent keyword, that the webpage does not correspond to a single geo-location, and providing the keyword as a suggestion to the advertiser for bidding, based on the determination that the webpage does not correspond to a single geo-location.

The disclosed subject matter also relates to a machine-readable medium comprising instructions stored therein, which when executed by a system, cause the system to perform operations comprising identifying a keyword from a webpage corresponding to an advertiser, and obtaining a plurality of search queries which include the keyword. The operations further comprise for each search query of the plurality of search queries, determining whether the search query includes a location term, and associating, in response to the determination that the search query includes the location term, the location term with the keyword. In addition, the operations comprise determining that the keyword is a multi-geo intent keyword having multiple geographical locations associated therewith, based on multiple location terms being associated with the keyword, determining, in response to determining that the keyword is a multi-geo intent keyword, that the webpage corresponds to a single geo-location, and refraining from providing the keyword as the suggestion to the advertiser for bidding, based on the determination that the webpage corresponds to a single geo-location.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
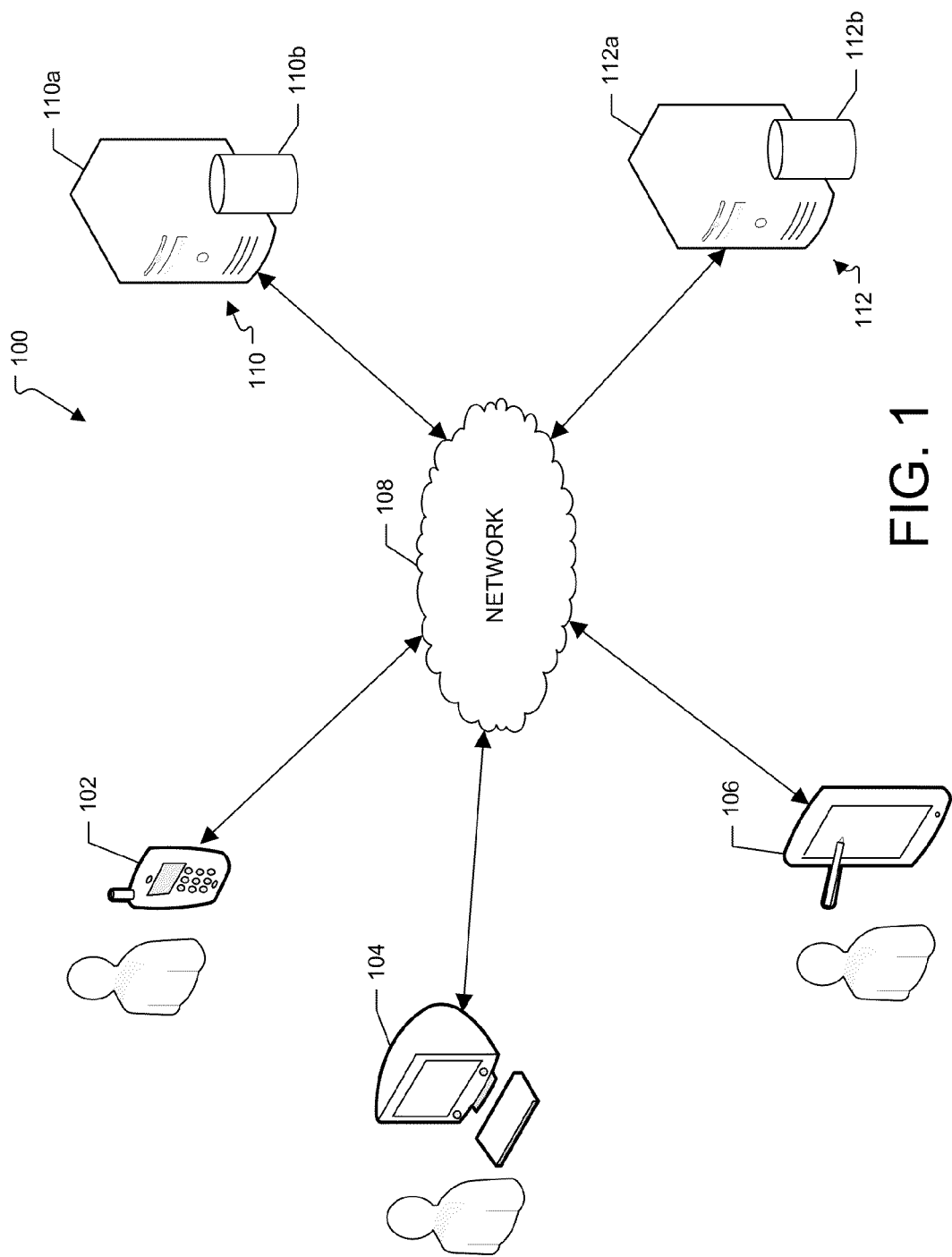
FIG. 1 illustrates an example network environment which can provide for processing multi-geo intent keywords.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, advertisers may bid on specific keywords appearing in a user query, where the advertiser's advertisement is presented along with the results of the user query (e.g., if the bidding is successful). The bidding process typically involves a set of keywords for each advertiser, where queries including the keyword are related to the advertisement.

It is possible the content of an advertiser's webpage or website is large in quantity, making it difficult for the advertiser to cover all possible keywords. Thus, a system for automatically suggesting keywords for advertisements (hereinafter an "automated ad system") can be used for evaluating the content of a webpage associated with an advertiser to suggest keywords for bidding.

One goal for an automated ad system is to minimize short click rates, which refer to the clicks that an advertiser pays for but do not lead to conversion. A prominent source of short click rates in automated ad systems is due to poor relevance between a keyword and the corresponding landing page. As used herein, a "landing page" is a webpage that appears in response to clicking on an advertisement.

For websites such as travel sites, keywords that have multiple geographic (hereinafter "multi-geo") intent, corresponding to more than one geographic location, can lead to significant short click rates when associated with landing pages directed to a particular geographic location. For example, the keyword "hotel_ABC" can be considered. In this example, "hotel_ABC" represents a hotel chain having multiple locations spanning multiple cities. Thus, hotel_ABC is considered to be a keyword with multi-geo intent. A landing page about "hotel_ABC San Francisco" can lead to short clicks, as many users may not necessarily be looking for the hotel in San Francisco. Thus, an automated ad system with improved suggestion of keywords may be desirable.

The subject disclosure provides for a system and method for processing multi-geo intent keywords. A keyword is identified from a webpage corresponding to an advertiser. A plurality of search queries are obtained (e.g., from log data), where each of the plural queries include the keyword. For each search query of the plurality of search queries, a determination is made whether the search query includes a location term, and if the user query includes the location term, the location term is associated with the keyword. A determination is made that the keyword is a multi-geo intent keyword having multiple geographical locations associated therewith, based on multiple location terms being associated with the keyword. In response to determining that the keyword is a multi-geo intent keyword, a determination is made that the webpage does not correspond to a single geo-location. The keyword is provided as a suggestion to the advertiser for bidding based on the determination that the webpage does not correspond to a single geo-location.

FIG. 1 illustrates an example network environment which can provide for processing multi-geo intent keywords. A network environment 100 includes computing devices 102, 104 and 106, and computing systems 110 and 112. Computing devices 102-106 and computing systems 110-112 can communicate with each other through a network 108. Each of computing systems 110-112 can include one or more computing devices 110a-112a (e.g., one or more servers), respectively, and one or more computer-readable storage devices 110b-112b (e.g., one or more databases), respectively.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 110a-112a may be provided access to or receive application software executed or stored on any of the other computing systems 102-106 and 110a-112a.

Each of computing devices 110a-112a may be any system or device having a processor, a memory, and communications capability for providing content to the electronic devices. In some example aspects, each of servers 110-112 can be single computing devices, for example, each can be a computer server. In other embodiments, servers 110-112 can be a shared and single computing device (e.g., with computing devices 110a-112a and databases 110b-112b being shared). In yet other embodiments, each of servers 110-112 can represent more than one computing device working together to perform the actions of a server computer (e.g., cloud computing). Further, each of computing devices 110a-112a can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 106) and server (e.g., servers 110-112) can occur via a virtual private network (VPN), Secure Shell (SSH) tunnel, or other secure network connection. In some aspects, network 108 may further include a corporate network (e.g., intranet) and one or more wireless access points.

In example aspects, processing device 110a executes computer instructions stored in data store 110b, for example, to host a search engine system. The search engine system can be usable by users at electronic devices 102-106. In this regard, server 110 may provide for accessing, fetching, aggregating, processing, searching, or maintaining documents (e.g., from the Internet).

Server 110 may implement a data aggregation service by crawling a corpus of documents (e.g., web documents), indexing entity location information (e.g., business locations) extracted from the documents, and storing the entity location information associated with the documents in a repository. The data aggregation service may be implemented in other ways, for example, by agreement with the operator(s) of server 110 to distribute content from their hosted documents via the data aggregation service.

The search engine system hosted on server 110 can perform a search in response to a query received from any of electronic devices 102-106, and can generate search results based on the query. The search results can be displayed in the form of a search results page for display on any of electronic devices 102-106. In addition, the search engine system hosted on server 110 can generate log data which annotates a history of search queries and/or search results with corresponding timestamps.

In example aspects, processing device 112a executes computer instructions stored in data store 112b, for example, to host an automated ad system, for processing multi-geo intent keywords. The automated ad system hosted on server 112 can be usable by users at any of electronic devices 102-106.

Server 112 identifies a keyword from a webpage corresponding to an advertiser, and obtains a plurality of search queries which include the keyword. For example, the plurality of search queries can be queries which were processed by the search engine system hosted on server 110, and can be accessed from log data generated by the search engine system.

For each search query of the plurality of search queries, server 112 determines whether the search query includes a location term, and in response to the determination that the search query includes the location term, server 112 associates the location term with the keyword. Server 112 further determines that the keyword is a multi-geo intent keyword having multiple geographical locations associated therewith, based on multiple location terms being associated with the keyword, and determines, in response to determining that the keyword is a multi-geo intent keyword, that the webpage does not correspond to a single geo-location. Based on the determination, server 112 provides the keyword as a suggestion to the advertiser for bidding, based on the determination that the webpage does not correspond to a single geo-location.

It should be noted that the subject technology is not limited to a server (e.g., server 110) for processing multi-geo intent keywords. In example aspects, each of electronic devices 102-106 can act as the automated ad system (e.g., by identifying a keyword, obtaining plural queries, associating location terms with the keyword, identifying multi-geo intent, and providing the keyword as a suggestion), in order to process multi-geo intent keywords.

Figure 2:
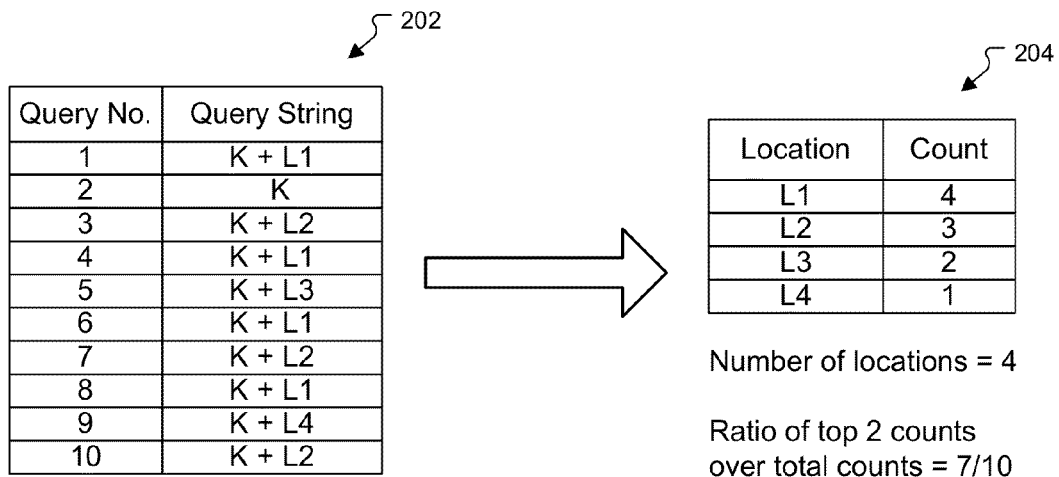
FIG. 2 illustrates an example of processing query strings, which include keywords and locations, to identify multi-geo intent keywords.
Figure 3:
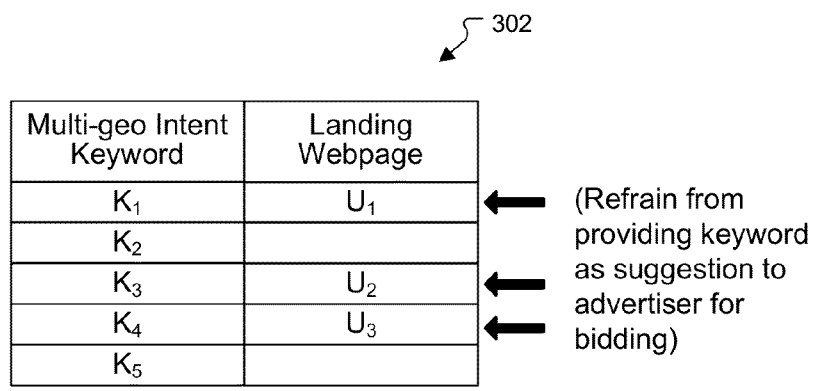
FIG. 3 illustrates an example of processing queries for webpages.

Thus, the automated ad system can identify multi-geo intent keywords (e.g., keywords associated with multiple geographical locations) and can disallow bidding on these keywords for landing pages associated with a single geo-location. FIG. 2 illustrates an example of identifying multi-geo intent keywords, and FIG. 3 illustrates an example of disallowing bidding for these keywords.

More particularly, FIG. 2 illustrates an example of processing query strings, which include keywords and locations, to identify multi-geo intent keywords. In this regard, a landing page may include several keywords which correspond to multi-geo intent keywords. To suggest keywords for an advertiser and to bid to place an advertiser's ad on a page, the automated ad system parses the content of the landing page to find keywords within the webpage.

To find keywords, in one example, the automated ad system compares the content of each URL of an advertiser's website against a set of user queries that are associated with the specific URL and/or the website. In example aspects, the user queries are associated with the URL or website, when the query results in the user visiting or being directed to the webpage associated with the URL or website. The system searches for the terms within each query and identifies those terms within the query which are present (e.g., appear in the content of the webpage) and prominent (e.g., highlighter, bolded, set apart otherwise from the content). The automated ad system then determines whether each keyword corresponds to a multi-geo intent keyword.

In this regard, if a keyword K is associated with multiple geo-locations, a search engine system (e.g., hosted on server 110) can receive queries of the form "K L", "L K" or other variants, where L is a location for locations L associated with the keyword. In the example of FIG. 2, locations L are denoted L1-L4, corresponding to four locations.

Examples of search queries provided to the search system engine can include "hotel def_new york" and "hotel_def in london", etc. Thus, an automated ad system (e.g., hosted on server 112) can associate with a keyword K, locations L that are observed in user queries in conjunction with K.

In example aspects, for every search query Q, a location detector can be used to detect a possible geo location (e.g., cities, states, islands, beaches). As used herein, a "location detector" encompasses its plain and ordinary meaning, including but not limited to a service which determines whether a search query Q includes any geographical location L, and identifies that location L within the search query. If a location L is found, the automated ad system trims location L from the search query Q, and associates the location L with the keyword K. In other words, $K=\{Q-L\}$, where K represents the part of the search query Q which is left after removing the location L from the search query Q.

In addition, the automated ad system can normalize the keyword by removing stopwords. As used herein, a "stopword" encompasses its plain and ordinary meaning, including but not limited to a word that is not particularly helpful in identifying a query subject or location. Examples of stopwords include, but are not limited to, "in", "of", and "the". The automated ad system can also perform stemming, which as used herein refers to converting a word like "hotels" to the root word "hotel", and can reorder terms within a search query.

The automated ad system (e.g., hosted on server 112) can then associate the location L with the normalized form of the keyword (e.g., and hence all keywords that lead to this normalized form). For example, for a search query "abc_hotel in london", the automated ad system detects the location "london" and associates it with the normalized form keyword "abc_hotel". With normalization, the location "london" is also associated with different forms of abc_hotel, such as "abc_hotels", "abc_hotels in", etc.

In addition to associating a location L with a keyword (e.g., normalized keyword), the automated ad system also counts the number of instances of the query. For example, if a keyword is associated with multiple locations but one location is dominant in the user search queries, there is a possibility that many users associate the keyword with the particular location. In one example, given a query "hotel_xyz london" that appears 100 times, a query "london hotel_xyz" that appears 50 times, and a query "hotel_xyz mumbai" that appears 10 times (e.g., based on log data), the automated ad system associates locations "london" with a count of 150, and "mumbai" with a count of 10 with the keyword "hotel_xyz".

In the example of FIG. 2, for queries numbers 1-10 in table 202, different query strings ranging from K, K+L1, K+L2, K+L3 and K+L4 are entered. The automated ad system can tally the number of times that a particular location (e.g., any of L1-L4) is paired with keyword K (e.g., which can be normalized) within a search query. For example, in table 204, location L1 appears 4 times in association with keyword K, location L2 appears 3 times, location L3 appears 2 times and location 4 appears 1 time.

The automated ad system can use different heuristics to identify keywords with multi-geo intent. In a first example heuristic, the determination can be made that a keyword has multi-geo intent if there are at least N associated locations (e.g., where N=5 or N=20). In the example of FIG. 2, the number of locations is 4. Thus, if N is set at 4, then the determination can be made that keyword K is a multi-geo intent keyword (e.g., using this heuristic alone). If N is set at a value greater than 4, then the determination can be made that keyword K is not a multi-geo intent keyword (e.g., using this heuristic alone).

Alternatively, or in addition to the first heuristic, a second heuristic can be used. Regarding the second heuristic, a determination is made that the keyword has multi-geo intent if counts for the top M (e.g., where M=2 or M=10) locations are less than a predetermined ratio (e.g., 80%) of the total location counts. In the example of FIG. 2, M can be set at 2. Thus, the counts for the top M (e.g., 2) locations is 7, and the total locations count is 10. If the threshold ratio is set at 70% or below, then the determination can be made that keyword K is a multi-geo intent keyword (e.g., using this heuristic alone). If the threshold ratio is set at a value greater than 70%, then the determination can be made that keyword K is not a multi-geo intent keyword (e.g., using this heuristic alone).

In example aspects, weights can be assigned to each of the first and second heuristics and a weighted score can be calculated based on the assigned weights. The determination of whether the keyword is a multi-geo intent keyword can be based on the weighted score (e.g., by comparison against a threshold value).

FIG. 3 illustrates an example of processing queries for landing pages, for example, to determine if keywords corresponding to the queries should be suggested to an advertiser associated with the landing pages. As noted above, a landing page may include several keywords which correspond to multi-geo intent keywords. These keywords can be identified by evaluating the content of the landing page for all possible keywords, and determining which of those keywords corresponds to a multi-geo intent keyword, for example, using the processes described with reference to FIG. 2. The determination of multi-geo intent keywords can be applied across multiple landing pages, so that each landing page has a list of multi-geo intent keywords associated with that landing page.

In example aspects, for each multi-geo intent keyword appearing within the content of the landing page, the automated ad system can further determine whether the landing page corresponds to a single geo-location. If the landing page is a single geo-location, then the multi-geo intent keyword(s) for that landing page may not be inappropriate as a suggestion for an advertiser associated with the landing page.

In this regard, if a keyword K is a multi-geo intent keyword, it is reasonable to direct a user to a home page of an advertiser or a search result page about the keyword K that in essence contains hotels from multiple locations. However, those landing pages U for a keyword K where U is not a home page, and is instead associated with a single prominent location should be filtered out.

In the example of FIG. 3, each of keywords $K_1$-$K_5$ in table 302 represent a keyword with multi-geo intent. Keywords $K_1$-$K_5$ may represent different keywords, or some of keywords $K_1$-$K_5$ can correspond to the same keyword. FIG. 3 further illustrates landing webpages $U_1$-$U_3$, which represent only those webpages which correspond to a single geo-location. In particular, keywords $K_1$, $K_3$ and $K_4$ are respectively paired with landing pages $U_1$, $U_2$ and $U_3$, each of which correspond to a single geo-location. On the other hand, keywords $K_2$ and $K_5$ are each paired with landing pages which do not correspond to single geo-locations.

As such, the automated ad system of the subject disclosure can refrain from providing the multi-geo intent keyword(s) K as a suggestion to the advertiser for those landing pages corresponding to a single geo-location. In other words, pairs of <K, U>, where K is a multi-geo intent keyword and U is a landing page corresponding to a single geo-location, can be removed from a list of all possible pairs of keywords and landing pages.

Different heuristics can be used to determine whether a particular webpage (e.g., landing page) corresponds to a single geo-location. In example aspects, a software tool can be used that associates a page U with a single business listing. If such a business listing is found with a location address on the page, then the page U is filtered for keyword K.

Alternatively, or in addition, the automated ad system can enumerate all the locations appearing within the landing page, map them to an associated latitude-longitude pair, and count the number of occurrences for each latitude-longitude pair. The automated ad system can cluster the latitude-longitude pairs by mapping them to a bigger region (e.g., a predefined region). If there is a single region which can be associated with most of the locations mentioned on the webpage, then the automated ad system can associate the page with a single geo-location.

Alternatively, or in addition, the automated ad system can determine if the webpage (e.g., landing page) is a leaf page. As used herein, a "leaf page" encompasses its plain and ordinary meaning, including but not limited to a webpage which corresponds to a single business listing (e.g., a particular hotel). The automated ad system can identify leaf pages for a website using URL patterns. For example, for a travel site such as trip_xyz.com, the leaf pages can fall in the pattern: http://www.trip_xyz/Hotel_Review-*.html. Thus, if the subject webpage is identified as a leaf page, the automated ad system can associate the webpage with a single geo-location.

Furthermore, the set of keywords can be stored for each webpage including a marker or other indicator for those keywords having multi-geo intent. In another example, a list of the keywords with multi-geo intent can be stored. When suggesting keywords for bidding, the automated ad system retrieves the keywords and suggests keywords based on the characteristics of the landing page, as described above. In one example, multi-geo intent keywords are only suggested for bidding where the landing page which does not correspond to a single geo-location. Otherwise, where the landing page is directed to a specific location the keywords identified as multi-geo intent keywords are not suggested as keywords for bidding with respect to the landing page.

Accordingly, the automated ad system can refrain from providing the multi-geo intent keyword(s) K as a suggestion to an advertiser for bidding. Pairs of <K, U>, where K is a multi-geo intent keyword and U is a landing page corresponding to a single geo-location, can be removed from a list of all possible pairs of keywords and landing pages.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personal information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 4:
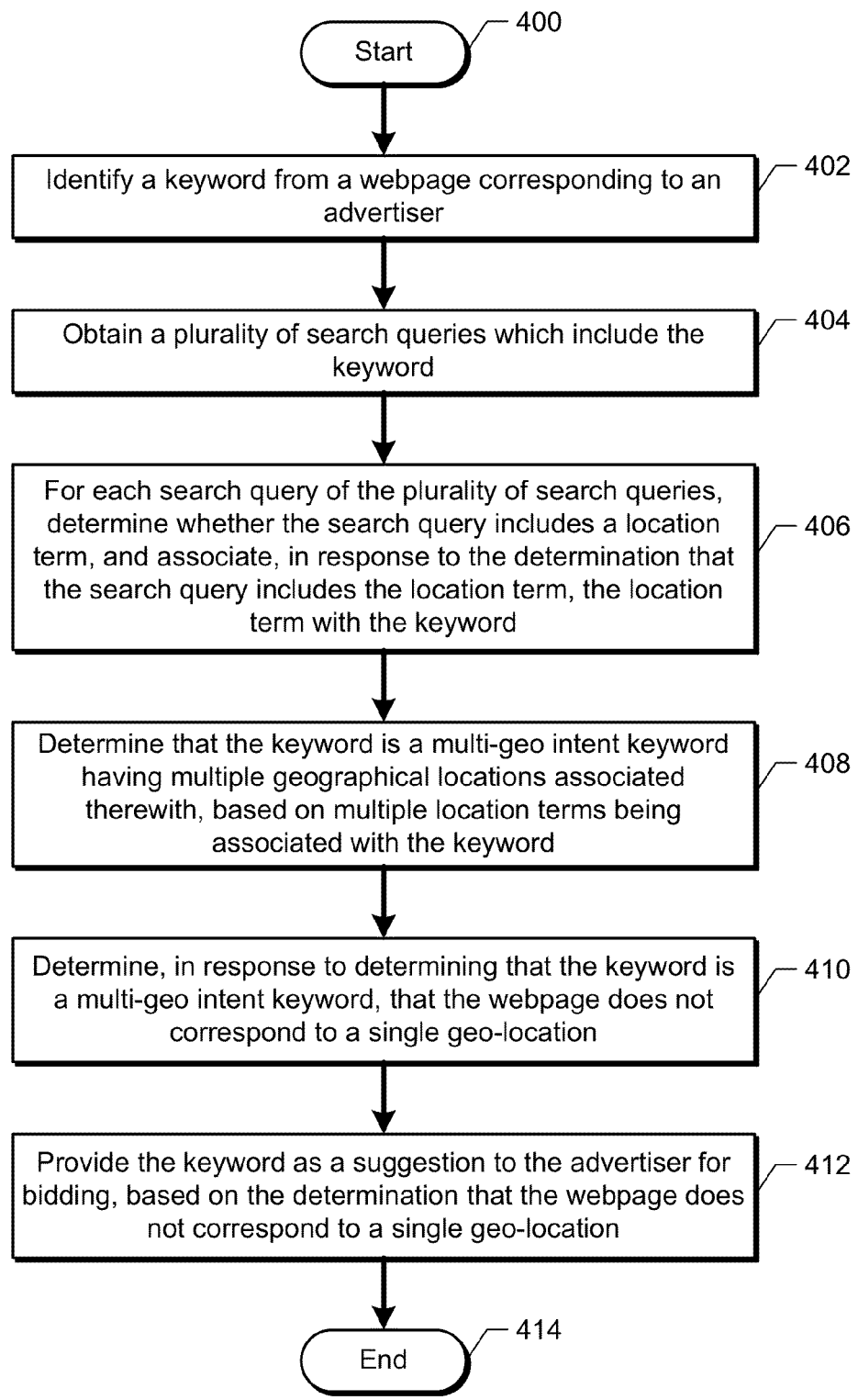
FIG. 4 illustrates an example process by which multi-geo intent keywords are processed.

FIG. 4 illustrates an example process by which multi-geo intent keywords are processed. Following start block 400, a keyword is identified from a webpage corresponding to an advertiser at step 402. The webpage can correspond to a home page for a website.

At step 404, a plurality of search queries which include the keyword is obtained. Obtaining the plurality of search queries can include accessing multiple search queries associated with a searching service, filtering out those queries of the multiple queries that do not include the keyword, and obtaining the plurality of search queries which include the keyword, based on the filtering.

At step 406, for each search query of the plurality of search queries, a determination is made whether the search query includes a location term, and, in response to the determination that the search query includes the location term, the location term is associated with the keyword. At step 408, a determination is made that the keyword is a multi-geo intent keyword having multiple geographical locations associated therewith, based on multiple location terms being associated with the keyword.

Determining that the keyword is a multi-geo intent keyword can include calculating the number of location terms associated with the keyword, determining that the number of location terms associated with the keyword meets a predefined threshold, and determining, in response to the determination that the number of location terms associated with the keyword meets the predefined threshold, that the keyword is a multi-geo intent keyword.

Alternatively, or in addition, determining that the keyword is a multi-geo intent keyword can include determining an association count for each location term associated with the keyword, wherein the association count for each location term comprises a number of instances that the location term is associated with the keyword, totaling the association counts for a predefined group of location terms to determine a group association count, totaling the association counts for all location terms to determine a total association count, determining that a ratio of the group association count relative to the total association count is less than a threshold ratio, and determining, in response to the determination that the ratio of the group association count relative to the total association count is less than the threshold ratio, that the keyword is a multi-geo intent keyword.

The keyword can be stored together with the determination that the keyword is a multi-geo intent keyword. The storing can include storing the multi-geo intent keyword within a list of multi-geo intent keywords.

At step 410, in response to determining that the keyword is a multi-geo intent keyword, a determination is made that the webpage does not correspond to a single geo-location. At step 412, the keyword is provided as a suggestion to the advertiser for bidding, based on the determination that the webpage does not correspond to a single geo-location.

Alternatively, in response to determining that the keyword is a multi-geo intent keyword, a determination can be made that the webpage corresponds to a single geo-location. The keyword is not provided as the suggestion to the advertiser for bidding, based on the determination that the webpage corresponds to a single geo-location.

Determining that the webpage corresponds to a single geo-location can be based on the webpage corresponding to a single business listing. Determining that the webpage corresponds to a single geo-location can be based on the webpage corresponding to a leaf page.

In example aspects, all location terms within the content of the webpage can be identified. For each location term, the location term can be associated with a latitude and longitude pair, and the location term can be mapped based on the associated latitude and longitude pair. For each latitude and longitude pair, a number of mapped location terms can be counted for the latitude and longitude pair. The latitude and longitude pairs can be clustered into predefined regions based on the counted numbers of mapped location terms. A determination can be made that one of the predefined regions has a number of mapped location terms that exceeds a threshold ratio relative to the number of all mapped location terms. Determining that the webpage corresponds to the single geo-location can be based on the determination that the one predefined region has the number of mapped location terms that exceeds the threshold ratio.

The process then ends at end block 414.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
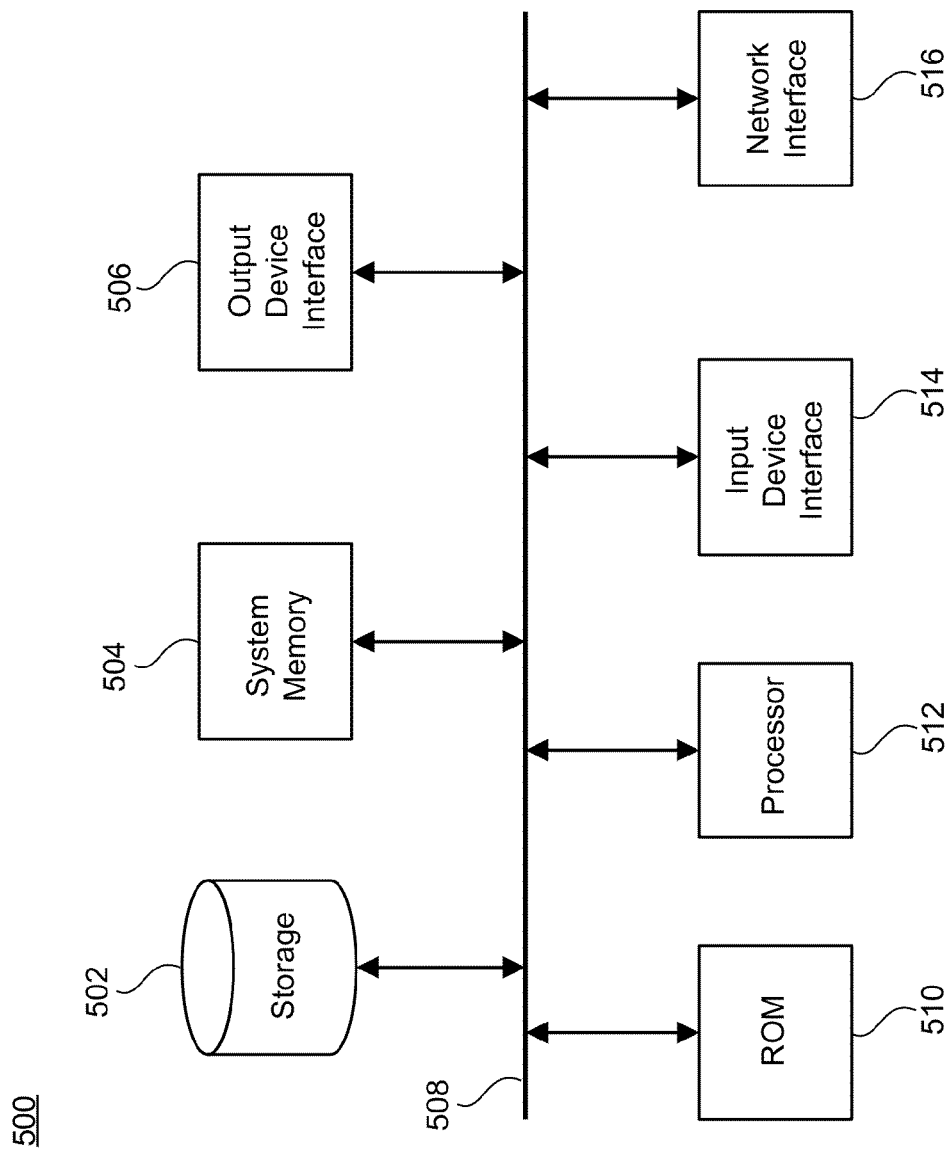
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for processing multi-geo intent keywords in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for processing multi-geo intent keywords, the method comprising:
   identifying a keyword from a webpage corresponding to an advertiser;
   obtaining a plurality of search queries which include the keyword;
   processing by one or more processors the plurality of search queries including for each search query of the plurality of search queries:
   determining, by the one or more processors, whether the search query includes a location term, and
   associating, by the one or more processors and in response to the determination that the search query includes the location term, the location term with the keyword;
   determining by the one or more processors that the keyword is a multi-geo intent keyword having multiple geographical locations associated therewith, based on multiple location terms being associated with the keyword, wherein determining that the keyword is a multi-geo intent keyword further includes evaluating processed search queries to locate two or more different search queries that have a same keyword and different location terms;
   determining, by the one or more processors and in response to determining that the keyword is a multi-geo intent keyword, that the webpage does not correspond to a single geo-location; and
   providing, by the one or more processors, the keyword as a suggestion to the advertiser for bidding, based on the determination that the webpage does not correspond to a single geo-location.

2. The method of claim 1, further comprising:
   determining, in response to determining that the keyword is a multi-geo intent keyword, that the webpage corresponds to a single geo-location; and
   refraining from providing the keyword as the suggestion to the advertiser for bidding, based on the determination that the webpage corresponds to a single geo-location.

3. The method of claim 2, wherein the determining that the webpage corresponds to a single geo-location is based on the webpage corresponding to a single business listing.

4. The method of claim 2, further comprising:
   identifying all location terms within the content of the webpage;
   for each location term, associating the location term with a latitude and longitude pair, and mapping the location term based on an associated latitude and longitude pair;

counting, for each latitude and longitude pair, a number of mapped location terms for the latitude and longitude pair;

clustering latitude and longitude pairs into predefined regions based on counted numbers of mapped location terms; and determining that one of the predefined regions has a number of mapped location terms that exceeds a threshold ratio relative to a number of all mapped location terms, wherein determining that the webpage corresponds to the single geo-location is based on a determination that the one predefined region has the number of mapped location terms that exceeds the threshold ratio.

5. The method of claim 2, wherein the determining that the webpage corresponds to a single geo-location is based on the webpage corresponding to a leaf page.

6. The method of claim 1, further comprising storing the keyword together with the determination that the keyword is a multi-geo intent keyword.

7. The method of claim 6, wherein the storing comprises storing the multi-geo intent keyword within a list of multi-geo intent keywords.

8. The method of claim 1, wherein the obtaining the plurality of search queries comprises:

accessing multiple search queries associated with a searching service;

filtering out those queries of the multiple search queries that do not include the keyword; and obtaining the plurality of search queries which include the keyword, based on the filtering.

9. The method of claim 1, wherein the webpage corresponds to a home page for a website.

10. The method of claim 1, wherein the determining that the keyword is a multi-geo intent keyword comprises:

calculating a number of location terms associated with the keyword;

determining that the number of location terms associated with the keyword meets a predefined threshold; and determining, in response to the determination that the number of location terms associated with the keyword meets the predefined threshold, that the keyword is a multi-geo intent keyword.

11. The method of claim 1, wherein the determining that the keyword is a multi-geo intent keyword comprises:

determining an association count for each location term associated with the keyword, wherein the association count for each location term comprises a number of instances that the location term is associated with the keyword;

totaling the association counts for a predefined group of location terms to determine a group association count;

totaling the association counts for all location terms to determine a total association count;

determining that a ratio of the group association count relative to the total association count is less than a threshold ratio; and determining, in response to the determination that the ratio of the group association count relative to the total association count is less than the threshold ratio, that the keyword is a multi-geo intent keyword.

12. A system for processing multi-geo intent keywords, the system comprising:

one or more processors; and a machine-readable medium comprising instructions stored therein, which when executed by the one or more processors, cause the one or more processors to perform operations comprising:

identifying a keyword from a webpage corresponding to an advertiser;

accessing multiple search queries associated with a searching service;

filtering out those queries of the multiple search queries that do not include the keyword;

obtaining a plurality of search queries which include the keyword, based on the filtering.

for each search query of the plurality of search queries:

determining whether the search query includes a location term, and associating, in response to the determination that the search query includes the location term, the location term with the keyword;

determining that the keyword is a multi-geo intent keyword having multiple geographical locations associated therewith, based on multiple location terms being associated with the keyword;

determining, in response to determining that the keyword is a multi-geo intent keyword, that the webpage does not correspond to a single geo-location; and providing the keyword as a suggestion to the advertiser for bidding, based on the determination that the webpage does not correspond to a single geo-location.

13. The system of claim 12, the operations further comprising:

determining, in response to determining that the keyword is a multi-geo intent keyword, that the webpage corresponds to a single geo-location; and refraining from providing the keyword as the suggestion to the advertiser for bidding, based on the determination that the webpage corresponds to a single geo-location.

14. The system of claim 13, wherein the determining that the webpage corresponds to a single geo-location is based on the webpage corresponding to a single business listing.

15. The system of claim 13, the operations further comprising:

identifying all location terms within the content of the webpage;

for each location term, associating a location term with a latitude and longitude pair, and mapping the location term based on an associated latitude and longitude pair;

counting, for each latitude and longitude pair, a number of mapped location terms for the latitude and longitude pair;

clustering latitude and longitude pairs into predefined regions based on counted numbers of mapped location terms; and determining that one of the predefined regions has a number of mapped location terms that exceeds a threshold ratio relative to a number of all mapped location terms, wherein determining that the webpage corresponds to the single geo-location is based on a determination that the one predefined region has the number of mapped location terms that exceeds the threshold ratio.

16. The system of claim 13, wherein the determining that the webpage corresponds to a single geo-location is based on the webpage corresponding to a leaf page.

17. The system of claim 12, the operations further comprising storing the keyword together with the determination that the keyword is a multi-geo intent keyword.

18. The system of claim 17, wherein the storing comprises storing the multi-geo intent keyword within a list of multi-geo intent keywords.

19. The system of claim 12, wherein the webpage corresponds to a home page for a website.

20. A non-transitory machine-readable medium comprising instructions stored therein, which when executed by a system, cause the system to perform operations comprising:
- identifying a keyword from a webpage corresponding to an advertiser;
- obtaining a plurality of search queries which include the keyword;
- processing the plurality of search queries including for each search query of the plurality of search queries:
  - determining whether the search query includes a location term, and
  - associating, in response to the determination that the search query includes the location term, the location term with the keyword;
- determining that the keyword is a multi-geo intent keyword having multiple geographical locations associated therewith, based on multiple location terms being associated with the keyword wherein determining that the keyword is a multi-geo intent keyword further includes evaluating processed search queries to locate two or more different search queries that have a same keyword and different location terms;
- determining, in response to determining that the keyword is a multi-geo intent keyword, that the webpage corresponds to a single geo-location; and
- refraining from providing the keyword as the suggestion to the advertiser for bidding, based on the determination that the webpage corresponds to a single geo-location.

* * * * *